May 7, 1929. J. H. WAGENHORST 1,712,127
TIRE CARRIER FOR AUTOMOBILES
Filed March 24, 1924 3 Sheets-Sheet 2
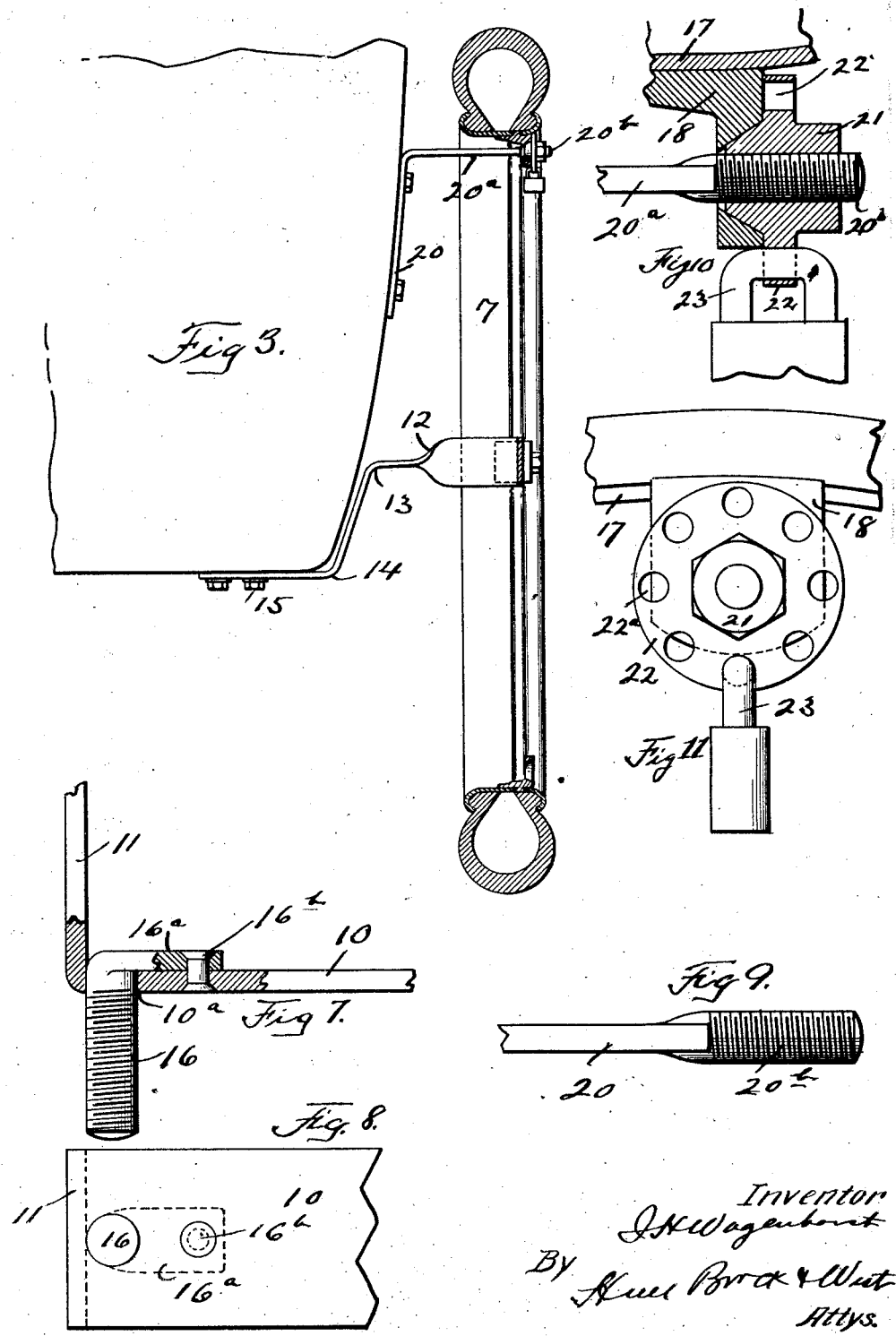

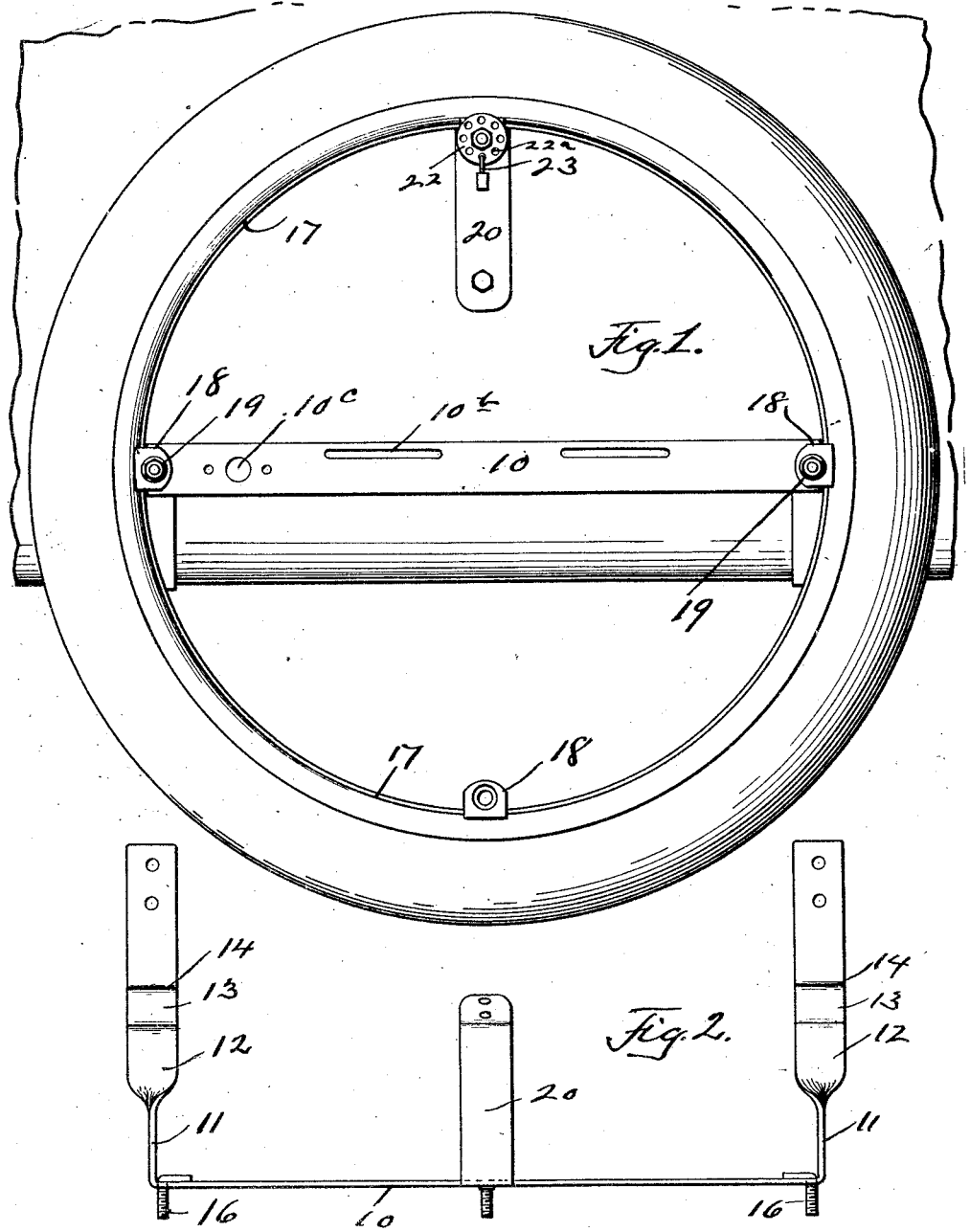

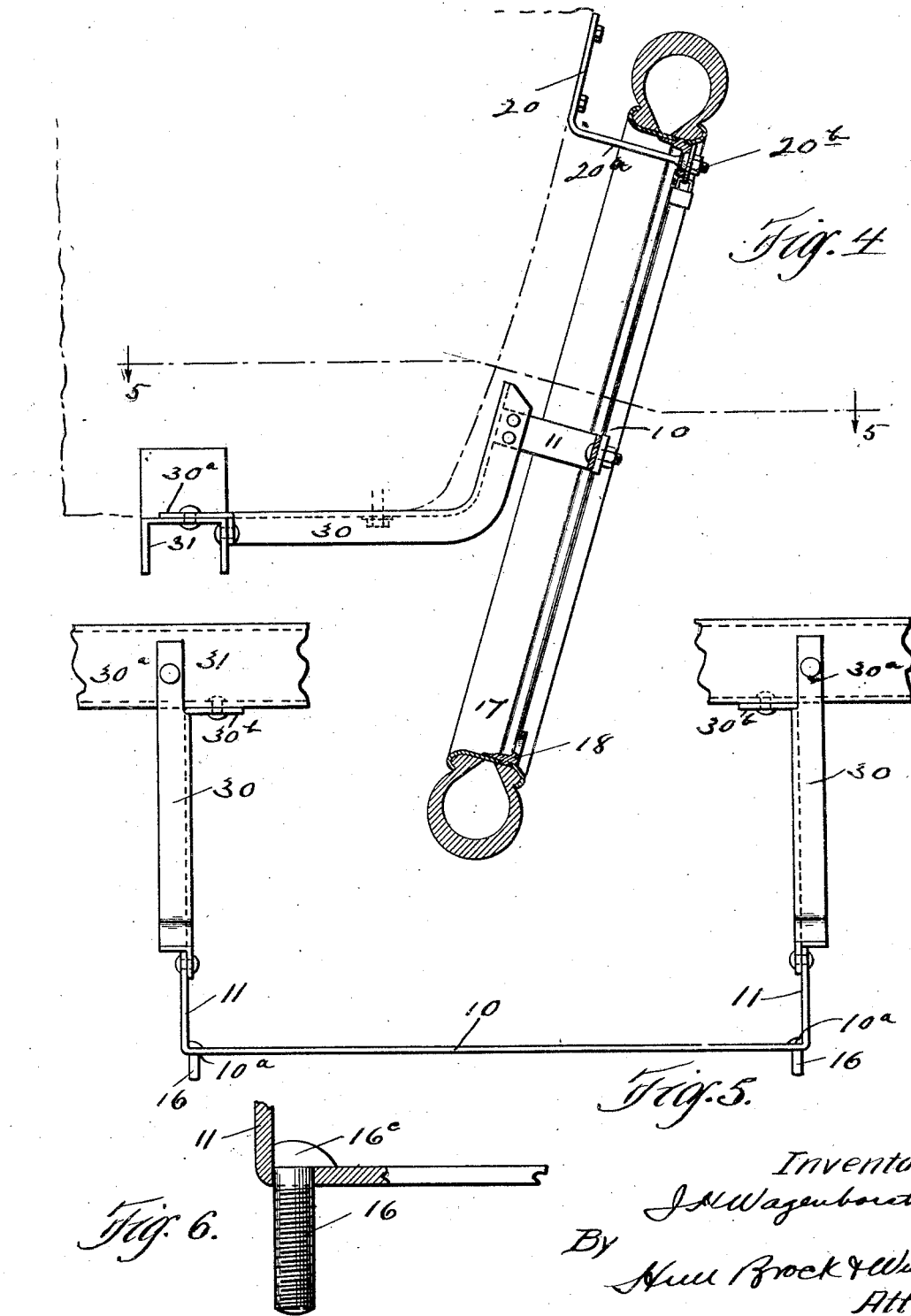

Patented May 7, 1929.

1,712,127

UNITED STATES PATENT OFFICE.

JAMES H. WAGENHORST, OF JACKSON, MICHIGAN.

TIRE CARRIER FOR AUTOMOBILES.

Application filed March 24, 1924. Serial No. 701,336.

This invention relates generally to tire carriers for automobiles and more particularly to a device intended for use in connection with demountable tire carrying rims having attached lugs; that is lugs permanently attached to the rim. These lugs project radially inwardly, said inwardly projecting portion being apertured.

Heretofore tire carriers attached to automobiles have embodied a circular band or ring connected to the automobile frame or body by means of suitable brackets and upon which the tire carrying rim has been placed and secured.

One object of the present invention is to do away with this encircling band thereby eliminating the cost and weight thereof.

Furthermore, these bands were liable to become misshaped or forced out of true and the elimination of the band or ring obviously overcomes this objection.

Furthermore, the employment of a ring or band necessitates a considerable variety of brackets or supports for connecting the band to various types of automobile frames or bodies. These objections are also avoided to a very large extent by the elimination of the tire carrying band.

My invention therefore consists in the various features of construction and in the novel manner of combining and arranging the same whereby the various objects hereinbefore recited are accomplished.

In the drawings forming a part of this specification Fig. 1 is a rear elevation of a tire carrier constructed in accordance with my invention, the tire carrying rim with the tire thereon being shown arranged upon the tire carrier; Fig. 2 is a plan view of the carrier detached from the automobile; Fig. 3 is a sectional elevation showing one form of my improved tire carrier connected to the body of an automobile; Fig. 4 is a sectional elevation showing a slightly modified form of support; Fig. 5 is a sectional view on the line 5—5 of Fig. 4, the tire carrying rim being omitted for the sake of clearness; Fig. 6 is a detailed view showing the manner of connecting the threaded stud to the transverse bar or band; Fig. 7 is a view showing a slight modification and Fig. 8 a face of such modified construction; Fig. 9 is a still further modified form of threaded stud; Fig. 10 a detailed view showing the manner of locking the rim upon the carrier and Fig. 11 is a face view of said locking mechanism.

Referring particularly to Figs. 1 and 3, it will be noted that I employ a transverse bar or band 10 which is bent forwardly at right angles as indicated at 11, then twisted as shown at 12 so as to bring the bar or band from a vertical plane to a horizontal plane. After twisting the bar at the points 12 said bars are bent downwardly as indicated at 13 and then forwardly as indicated at 14 so as to permit the forward ends of said bar or band to be placed beneath the bottom of the automobile and to which they are attached by means of bolts 15.

The bar 10 is provided at each end with an opening 10$^a$ and through which is projected the threaded stud 16, the forward end of said stud being turned over as shown at 16$^a$ and riveted to the bar or band 10 as shown at 16$^b$. This permanently connects the stud to the bar and holds the stud against rotation, the threaded portion thereof projecting rearwardly as most clearly shown in Fig. 2.

The tire carrying rim 17 has a plurality of inwardly extending apertured lugs 18 permanently connected thereto and in placing the rim upon the carrier two of these apertured lugs are placed over the rearwardly extending threaded stud 16 and nuts 19 are screwed upon the projecting nuts of the studs for the purpose of securely connecting the tire to the carrier.

The bar 10 may have slots 10$^b$ produced therein for connection of the license plate and an opening 10$^c$ may also be provided for the attachment of the usual electric tail lamp. These, however, are features which do not enter into the operation of the tire carrier.

In practice I also prefer to employ an arm 20 which is rigidly secured to the rear of the automobile body and is then bent horizontally as shown at 20$^a$ and terminates in a threaded stud 20$^b$ which projects through one of the apertured lugs and the nut 21 which is screwed upon the threaded stud 20$^b$ is formed with an annular flange 22 having a series of apertures 22$^a$ produced therein and through which the hasp or shackle 23 of a lock can be placed in order to prevent the nut being rotated, it being obvious that if the nut can be held against rotation, it would be impossible to remove the same from the stud and consequently the rim can be securely locked to the carrier and the theft thereof prevented.

It is obvious that by the employment of the supporting arms they can be arranged at the proper points for connection in order to accommodate the particular size of rim which is to be used upon the car.

It will be noted that the usual tire carrying band has been eliminated and consequently I provide a tire carrier consisting of a minimum number of parts.

Instead of connecting the arms directly to the body of the automobile, I may employ rearwardly extending channeled angular arms 30 which at their forward ends are secured to the transverse channel member 31 to which the body of the automobile is connected, and in making this connection, the forward ends of the channeled arms can be split, one portion thereof 30$^a$ being attached to the top of the channel member 31 while the other portion 30$^b$ is bent so as to be riveted to the side of the channel member 31. The channeled arms 30 are extended rearwardly and upwardly as shown in Fig. 4 and the forwardly extending ends 11 of the transverse bar or band 10 are riveted to said rearwardly and upwardly projecting ends of the bars of the arms 30, as most clearly shown in Figs. 4 and 5.

The bar 10 is formed with openings 10$^a$ at each end as previously described and the threaded stud 16 is projected therethrough, said stud having a head 16$^c$ formed with a flat side so as to contact with the adjacent arm 11 and thereby prevent rotation. The supplemental arm 20 is employed as previously described, this arm being attached to the back of the vehicle body and then projected rearwardly as indicated at 20$^a$ in Fig. 4, terminating in the threaded stud 20$^b$.

In this construction, the rim is fastened upon the carrier exactly the same as previously described and the two rearwardly projecting studs 16 pass through two of the apertured lugs of the rim and the threaded stud 20$^b$ passes through another one of the lugs and has the nut 21 screwed thereon. The lock 23 is employed in this connection exactly the same as previously described.

It will be noted that the tire carrier constructed in the manner shown in Figs. 4, 5 and 6 is of the same general character as the carrier shown in Figs. 1, 2 and 3 and eliminates all of the objectionable features of the tire carriers now in common use.

A tire carrier constructed in accordance with my invention is exceedingly simple and inexpensive and eliminates considerable weight by doing away with the circular band or rib heretofore referred to.

Certain features disclosed and claimed in this application are also disclosed but not claimed in my copending application for tire carrier Serial No. 491,655, filed August 12, 1921. The means for locking a demountable rim upon the carrier shown and claimed in this application is also shown but not claimed in my Letters Patent No. 1,590,140, issued June 22, 1926, application filed March 22, 1924.

Having thus described my invention, what I claim is:—

1. In a tire carrier the combination with a rim having an apertured lug attached thereto, of a threaded stud passing through said lug, a nut screwed upon said lug, said nut having an annular flange provided with openings, and a lock connected to said flange.

2. In a tire carrier the combination with a rim having an apertured lug attached thereto, of a threaded stud passing through said lug, a nut screwed upon said lug, said nut having an annular flange provided with a series of openings therein, and a padlock having its shackle passed through one of said openings and extending beneath the edge of said lug whereby said shackle cooperates with the edge of said lug to prevent unscrewing of the nut without removal of the padlock.

In testimony whereof, I hereunto affix my signature.

JAMES H. WAGENHORST.